Aug. 4, 1970 — E. M. RYLEWSKI — 3,522,997
INDUCER
Filed July 1, 1968
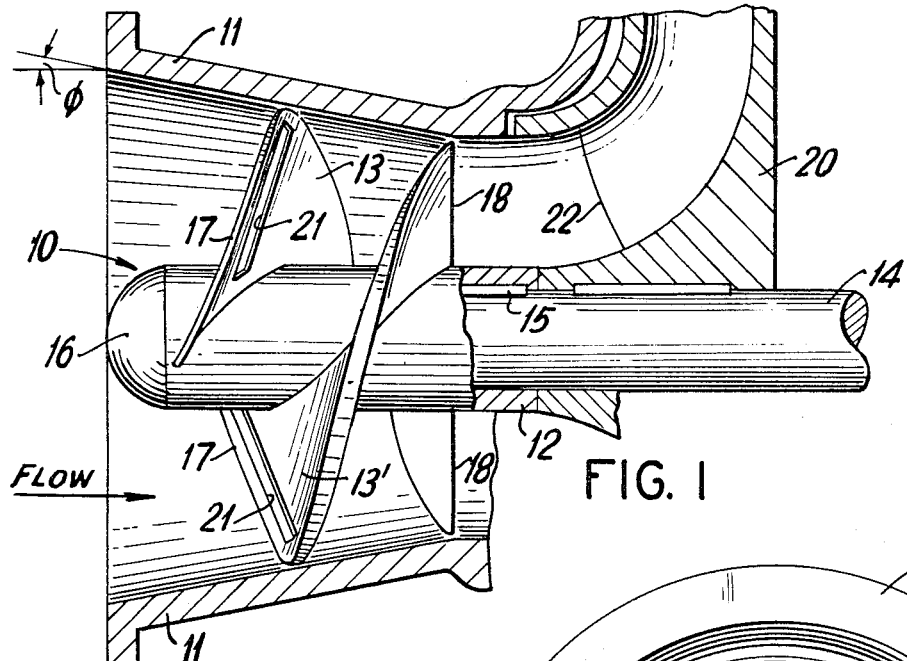
FIG. 1
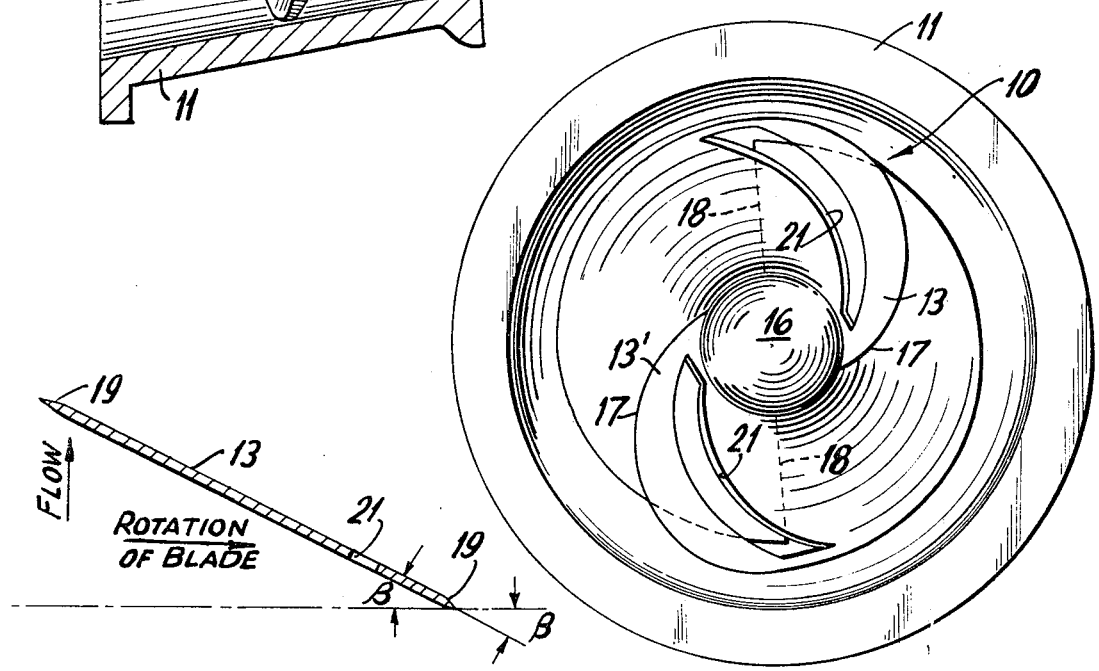
FIG. 3
FIG. 2
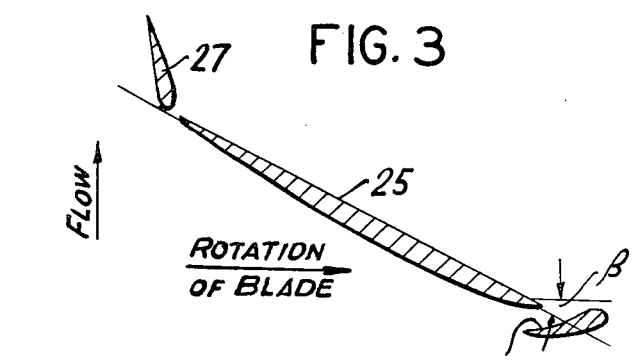
FIG. 4
INVENTOR.
EUGENIUSZ M. RYLEWSKI
BY
Morgan, Finnegan, Durham & Pine
ATTORNEYS

United States Patent Office 3,522,997
Patented Aug. 4, 1970

3,522,997
INDUCER
Eugeniusz M. Rylewski, 44 Oakland Road,
Maplewood, N.J. 07040
Filed July 1, 1968, Ser. No. 741,791
Int. Cl. F04d *13/12, 3/02*
U.S. Cl. 415—72           9 Claims

ABSTRACT OF THE DISCLOSURE

An inducer having at least one blade extending about a hub member which is located within a conical chamber having a converging taper from the inlet to the outlet thereof, and wherein the external extremity of the blade defines a cone whose angle of conicity is substantially equal to that of the conical chamber housing the inducer and whose diameter is slightly less than that of the chamber. The blade may be of either constant or variable pitch and may have either a constant thickness or an aerodynamic profile. In preferred embodiments, the blade is swept back at its leading edge and is additionally provided with either at least one aerodynamic slot, or an aerodynamic slat, or a leading edge aerodynamic flap, or a trailing edge aerodynamic flap, or various combinations thereof.

BACKGROUND AND OBJECTS OF THE INVENTION

This invention relates generally to inducers and relates more particularly to a new and improved inducer having utility in all rotating fluid handling machines, such as, for example, impeller pumps and turbines, rotary pumps and motors, as well as in both centrifugal and rotary compressors and fans.

The main purpose of an inducer is to supply the principal organ, usually an impeller or rotor member, of a fluid handling machine with sufficient pressure to prevent or minimize the cavitation which would normally occur in the machine. Another purpose of an inducer is to minimize the entrance shock at the inlet of the fluid handling machine and to produce a controlled pre-rotation of the fluid, which reduces the relative velocity between the fluid and the principal impeller or rotor member at the inlet of the machine, thereby increasing the efficiency of the entire machine.

Both of the foregoing factors permit higher rotational speeds of the fluid handling machine and, consequently, a drastic reduction in the size and weight of the machine, as well as that of the power unit for the machine for a given output.

In order to properly achieve the above results, and in order to be economically practical and commercially desirable, the inducer should (1) operate efficiently so as preferably not to impair the efficiency of the fluid handling machine itself; (2) continue to function even at very small pressures at the inlet of the fluid handling machine; (3) have minimum surge and pressure fluctuation levels at any point of operation; (4) have minimum mechanical vibration levels at any point of operation; (5) have minimum noise levels at any point of operation; and (6) have a low cost of manufacture.

While numerous proposals for inducers have previously been made, all of these prior proposals have failed to meet at least four out of the six above-listed requirements. They have impaired systematically the efficiency of the fluid handling machine, or have had objectionable surge, pressure fluctuations and mechanical vibrations, particularly at low flow rates, and have been accompanied by a high level of noise.

It is therefore an object of this invention to provide a new and improved inducer.

Another object of this invention is to provide a new and improved inducer which eliminates the disadvantages of previously proposed inducer structures.

Another object of this invention is to provide a new and improved inducer which operates at such efficiency that it preferably not only does not impair the efficiency of the entire fluid handling machine to which it is applied, but can improve it by proper matching of the inducer outlet to the main impeller inlet of the machine.

Another object of this invention is to provide a new and improved inducer which when applied to a machine handling a liquid can operate efficiently even at suction pressures which are so low as to be very close to the vapor pressure of the liquid passing through the machine.

Another object of this invention is to provide a new and improved inducer which prevents entrance shock and improves inlet conditions in all fluid handling machines, including those in which cavitation does not occur.

Another object of this invention is to provide a new and improved inducer which can be operated along the whole of its characteristic range without encountering noticeable surge or pressure fluctuation levels.

Another object of this invention is to provide a new and improved inducer which is very quiet during operation.

Another object of this invention is to provide a new and improved inducer which can be utilized in all fluid rotating machines, and which is in no way limited by the type of fluid being handled by the machine.

Another object of this invention is to provide a new and improved inducer whose manufacture can be considerably simplified and its cost therefore substantially lowered over that of inducers presently commercially available.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention is embodied in a new and improved induce construction, having utility in all rotating fluid handling machines, which includes at least one blade extending about a hub member which is located within a conical chamber having a converging taper from the inlet to the outlet thereof, and wherein the external extremity of the blade defines a cone whose angle of conicity is substantially equal to that of the conical chamber housing the inducer and whose diameter is slightly less than that of the chamber. The blade may be of either constant or variable pitch and may have either a constant thickness or aerodynamic profile.

In preferred alternate embodiments of the invention, the blade is swept back along its leading edge and is additionally provided with either at least one aerodynamic slot, or an aerodynamic slat, or a leading edge aerodynamic flap, or a trailing edge aerodynamic flap, or various combinations thereof.

In other alternate embodiments of the invention, the inducer is located within a cylindrical chamber and the external extremity of the blade defines a cylinder having a diameter slightly less than that of the chamber. In these embodiments, the blade is preferably swept back along its leading edge and is additionally provided with either at least one aerodynamic slot, or an aerodynamic slat, or a leading edge aerodynamic flap, or a trailing edge aerodynamic flap, or various combinations thereof.

It will be understood that the foregoing general description and the following detailed description as well are exemplary and explanatory of the invention but are not restrictive thereof.

The accompanying drawings, referred to herein and constituting a part hereof, illustrate preferred embodiments of the invention, and together with the description, serve to explain the principles of the invention.

BRIEF DESCRIPTION OF THE DRAWINGS

Of the drawings:

FIG. 1 is a fragmentary view in side elevation, partly in section, of an inducer construction in accordance with the invention, the view illustrating the inducer located at the inlet of a centrifugal pump;

FIG. 2 is a view in front elevation of the inducer of FIG. 1, the view looking downstream;

FIG. 3 is a development view of a typical blade of the inducer of FIG. 1, the view being taken along the length of the blade at a constant radius from the hub, illustrating the constant thickness profile of the blade; and FIG. 4 is a development view of an alternate embodiment of the inducer blade of FIG. 3, the view being taken along the length of the blade and at a constant radius from the hub, illustrating the aerodynamic profile of the blade, the leading edge slat, and the trailing edge flap.

DESCRIPTION OF THE PREFERRED EMBODIMENTS

As used herein, the term "aerodynamic" is intended, for purposes of simplicity only, to describe both aerodynamic and hydrodynamic profiles.

Referring now to the accompanying drawings, and more particularly to FIGS. 1–3 thereof, there is shown a preferred embodiment of the invention wherein the inducer, designated generally by reference numeral 10, is housed within a conical chamber 11 converging from the inlet towards the outlet thereof.

As here preferably embodied, inducer 10 includes a rotatably mounted, cylindrical hub 12 having attached thereto, and serving to support, a pair of blade members 13, 13'. Hub 12 is suitably mounted for rotation with driven shaft 14, as by key 15. A cap 16 secures the axial position of the inducer.

It will be understood to those skilled in the art that hub 12 may be machined from one piece and the blades 13, 13' suitably prepared separately, as by machining, rolling or casting and thereafter attached to the hub in any conventional manner, as by welding, screwing, or the like. It will also be understood that, alternatively to the foregoing, the hub and blades may be machined or cast together, or that the hub, blades and cap may all be formed from one piece and the whole unit mounted onto shaft 14.

In accordance with the invention, inducer 10 is located in a conical chamber 11 which converges in area from the inlet to the outlet thereof, and the external extremity of the inducer blades 13, 13' generates a similarly oriented cone upon rotation of the inducer about its axis of revolution whose angle of conicity, indicated by $\phi$ in FIG. 1, is substantially equal to that of chamber 11.

It will be understood to those skilled in the art that the preferred angle of conicity $\phi$ will be determined on the basis of the inlet conditions of the incoming flow of fluid and the characteristics of the particular fluid handling machine to which the inducer is to be applied.

It will also be seen that there is a small clearance between the external extremity of the inducer blades and the internal surface of the conical chamber. The preferred distance for this clearance is that distance which provides the best cavitation performance of the inducer for which the efficiency is still satisfactory.

Advantageously, and as here preferably embodied, blades 13, 13' of inducer 10 have a constant lead. The blade lead is defined as the axial distance over which the blade is wrapped around the hub in one complete revolution. It means that at any radius the following equation is satisfied:

$$2\pi r \tan \beta = \text{lead} = K \text{ (constant)}$$

wherein $\beta$ is defined as the angle between a first line drawn normal to the inducer axis and a second line drawn tangent to the blade (see FIGS. 3 and 4). The fact that inducer blades 13, 13' have a constant lead means that the angle is the largest at the hub and then continuously decreases as the external extremity of the blade is approached.

Also advantageously, the leading or inlet edges 17 of the inducer blades 13, 13' have a sweep-back configuration as shown in FIGS. 1 and 2. With this configuration, the leading edge of each inducer blade attacks the incoming fluid first at the hub, which is at its smallest diameter, and then gradually at larger and larger diameters, until the last portion of the leading edge attacking the fluid is at the periphery or external extremity of the blade.

The trailing edges 18 of the blades are preferably radial, as illustrated in FIGS. 1 and 2—i.e., the fluid leaves the blades at the same axial position. Alternatively, there may be a departure from the radial termination of the blades and they may, for example, terminate in a sweep configuration. As a further alternative, the trailing edges 18 of the inducer blades may be joined together with the leading edges 22 of the main impeller or rotor member 20, whereby the inducer and rotor member of the fluid handling machine constitute an integral unit.

Also, advantageously, the blade thickness may vary in the radial direction, being of greatest thickness at the hub and decreasing in thickness continuously to the tip, or external extremity, of the blade. It will be understood that the change in blade thickness will be dictated by the strength of the blade. Thus, if the strength of the blade allows it, this thickness can be constant from the hub to the tip thereof. In addition, the leading and trailing edges 17, 18, respectively, of blades 13, 13' are provided with suitable edge tapers, or fairings, as shown by reference numeral 19 in FIG. 3.

With reference to FIGS. 3 and 4, there are shown development views of an inducer blade, which are taken along the length of the blade at a constant radius from the hub, and which illustrate alternate blade profiles. Thus, FIG. 3 illustrates a blade having a constant thickness profile and FIG. 4 illustrates a blade having an aerodynamic profile.

In the case of constant thickness blade profile, usually called "flat plate," the blade angle $\beta$ is defined as the angle between the center line of the blade over which the constant thickness of the blade is distributed and a line drawn normal to the inducer axis (see FIG. 3).

In the case of an aerodynamic profile, the angle $\beta$ is defined as the angle between the chord line of the profile and a line drawn normal to the inducer axis. The chord line is defined as a straight line connecting the leading and trailing edges of the profile (see FIG. 4).

In accordance with the invention, and as here preferably embodied, the inducer blades 13, 13' are each provided with an aerodynamic slot 21, formed in the forward portion of the blade, preferably near the leading edge 17 thereof. Advantageously, as perhaps best seen in FIG. 3, slot 21 is located in the approximate first quarter of the developed length of the blade. It will be understood, however, that the inducer blades may be provided with more than one aerodynamic slot and that the multiple combination of slots may extend over a substantial portion of the length of the blade.

Referring now more particularly to FIG. 4 of the accompanying drawings, there is illustrated an alternate embodiment of the inducer blade of FIGS. 1–3, the view depicting an inducer blade 25, having an aerodynamic profile, a leading edge aerodynamic slat 26, and a trailing edge aerodynamic flap 27. It will be understood that slat 26 and flap 27 may be either movably mounted onto blade 25 or fixedly secured thereto.

It will be apparent from the foregoing that the new and improved inducer as herein embodied achieves the objects of the invention herein specifically set forth.

Thus, an inducer is usually designed for a small angle of attack at a given flow rate, the angle of attack being defined as the angle between the relative velocity of the incoming fluid and the plane of the blade. For a given rotational speed and angle of the inducer blade, the angle of attack increases with decreasing axial velocity of the incoming fluid and vice-versa. The axial velocity of the incoming fluid parallel to the axis of rotation of the inducer is equal to the volume of the fluid divided by the area of the passage normal to the inducer axis per rate of time.

It has heretofore been known that an inducer operating at a flow rate lower than the design flow rate is unstable and noisy. This is due to the fact that at low flow rates the angle of attack approaches a value at which separation of the fluid from the blades occurs.

It has been found that the application of an auxiliary high-lift device of an aerodynamic profile to the inducer blades, such as one or more aerodynamic slots, or an aerodynamic slat, or a leading edge aerodynamic flap, or a trailing edge aerodynamic flap, or combinations of such high-lift devices, plays a very important role in improving the cavitation performance of the inducer and at the same time in diminishing the surge and vibrations which normally take place in a fluid handling machine operating at low suction pressures. The provision of these high-lift devices in the inducer blades furthermore is equally advantageous in blades of either constant thickness or aerodynamic profiles.

Thus, these high-lift devices have been found to permit the operation of the blades at the high angles of attack that occur at flow rates lower than the design flow rate. These devices also serve to duct high-energy fluid from the pressure side to the depression side of the blade and direct this fluid in such a manner as to delay its separation from the blades by providing boundary-layer control. Furthermore, these devices, particularly the leading edge type, reduce the severity of the pressure peak and thereby delay the onset of cavitation in the handled fluid.

The provision of a conical inducer located in a conical chamber has been found to have at least two primary advantages. Firstly, the converging type of flow improves the cavitation behavior of the inducer, especially at the tips, or external extremities of the blade, where the danger of cavitation is the greatest. Secondly, it permits the inducer to be designed for a decreased axial velocity and, consequently, a decreased kinetic energy level at the inlet of the inducer. This is particularly important when it is desired to operate the machine at extremely low absolute pressure, close to the vapor pressure of the liquid being handled.

Finally, while it has heretofore generally been thought that a blade having a variable lead was necessary for good cavitation performance and efficiency, it has been found that an inducer blade having a constant lead, while being the simplest and cheapest to manufacture, attains better efficiency than a blade having a variable lead and, in some cases, attains both better efficiency and a better cavitation performance.

It will thus be understood that one or more of the objects of the invention may be achieved by one or more of the foregoing improvements. While it will be apparent that it may be desirable to achieve certain performance objectives at the expense of others, it has been found that, for the first time, all of the previously mentioned basic requirements are obtained at the minimum manufacturing cost, where the inducer is embodied to include one or more blades of constant lead, constant thickness profile, having at least one aerodynamic slot, defining a cone at their external extremities and housed within a conical chamber.

The invention in its broader aspects is therefore not limited to the specific embodiments herein shown and described by departures may be made therefrom within the scope of the accompanying claims, without departing from the principles of the invention and without sacrificing its chief advantages.

What is claimed is:

1. In an inducer having a hub member and at least one blade member extending completely around said hub member and adapted to be mounted in operative association with a rotating fluid handling machine, the improvement therein which comprises: the trailing edge of said inducer blade constitutes the leading edge of the rotor member of said rotating fluid handling machine and said inducer blade includes at least one aerodynamic slot extending over a substantial portion of the height of the blade and substantially parallel to the leading edge of the blade.

2. In an inducer having a hub member and at least one blade member extending completely around said hub member, the improvement therein which comprises: mounting said inducer for rotation within a stationary conical chamber converging in a direction from the inlet to the outlet thereof; the external extremity of said blade member defining a cone upon rotation of said inducer about its axis of revolution, the angle of conicity of said cone being substantially equal to that of said conical chamber and the diameter of said cone at any point along the axis thereof being slightly smaller than that of said conical chamber; said blade member having a sweep-back configuration along its leading edge; and said blade member further having a constant thickness profile and a constant lead and said inducer blade includes at least one aerodynamic slot extending over a substantial portion of the height of the blade and substantially parallel to the leading edge of the blade.

3. In an inducer having a hub member and at least one blade member extending completely around said hub member, the improvement therein which comprises: mounting said inducer for rotation within a stationary conical chamber converging in a direction from the inlet to the outlet thereof; the external extremity of said blade member defining a cone upon rotation of said inducer about its axis of revolution of said inducer about its axis of revolution, the angle of conicity of said cone being substantially equal to that of said concial chamber and the diameter of said cone at any point along the axis thereof being slightly smaller than that of said conical chamber; said blade member having a sweep-back configuration along its leading edge; and said blade member further having an aerodynamic profile and a constant lead and said inducer blade includes at least one aerodynamic slot extending over a substantial portion of the height of the blade and substantially parallel to the leading edge of the blade.

4. An inducer as claimed in claim 3 wherein said inducer blade includes at least one aerodynamic flap at the trailing edge of the blade member.

5. In an inducer having a hub member and at least one blade member extending completely around said hub member, the improvement therein which comprises: mounting said inducer for rotation within a stationary conical chamber converging in a direction from the inlet to the outlet thereof; the external extremity of said blade member defining a cone upon rotation of said inducer about its axis of revolution, the angle of conicity of said cone being substantially equal to that of said conical chamber and the diameter of said cone at any point along the axis thereof being slightly smaller than that of said conical chamber; said blade member having a sweep-back configuration along its leading edge; and said blade member further having a constant thickness profile and a variable lead and said inducer blade includes at least one aerodynamic slot extending over a substantial portion of the height of the blade and substantially parallel to the leading edge of the blade.

6. In an inducer having a hub member and at least one blade member extending completely around said hub member, the improvement therein which comprises: mounting said inducer for rotation within a stationary chamber; said blade member having a constant lead and a constant thickness profile and being formed in a sweep-back configuration along its leading edge; and said blade member further having at least one aerodynamic slot extending over a substantial portion of the height thereof and substantially parallel to the leading edge thereof.

7. In an inducer having a hub member and at least one blade member extending completely around said hub member, the improvement therein which comprises: mounting said inducer for rotation within a stationary chamber; said blade member having a constant lead and an aerodynamic profile and being formed in a sweep-back configuration along its leading edge; and said blade member further having at least one aerodynamic slot extending over a substantial portion of the height thereof and substantially parallel to the leading edge thereof.

8. An inducer as claimed in claim 7 wherein said inducer blade includes at least one aerodynamic flap at the trailing edge of the blade member.

9. In an inducer having a hub member and at least one blade member extending completely around said hub member, the improvement therein which comprises: mounting said inducer for rotation within a stationary chamber; said blade member having a variable lead and a constant thickness profile and being formed in a sweep-back configuration along its leading edge; and said blade member further having at least one aerodynamic slot extending over a substantial portion of the height thereof and substantially parallel to the leading edge thereof.

References Cited

UNITED STATES PATENTS

| | | | |
|---|---|---|---|
| 2,314,572 | 3/1943 | Chitz | 230—122 |
| 2,368,530 | 1/1945 | Edwards | 103—113 |
| 2,576,700 | 11/1951 | Schneider | 230—122 |
| 2,721,677 | 10/1955 | Meredew et al. | 103—88 |
| 2,938,662 | 5/1960 | Eckert et al. | 230—134 |
| 3,071,194 | 1/1963 | Geske | 170—156 |
| 3,163,119 | 12/1964 | Huppert et al. | 103—88 |
| 3,200,754 | 8/1965 | Burgin | 103—88 |
| 3,273,506 | 9/1966 | Jamieson | 103—88 |
| 3,299,821 | 1/1967 | Silvern | 103—88 |

HENRY F. RADUAZO, Primary Examiner

U.S. Cl. X.R.

103—89

PO-1050
(5/69)

UNITED STATES PATENT OFFICE
CERTIFICATE OF CORRECTION

Patent No. 3,522,997     Dated August 4, 1970

Inventor(s) Eugeniusz M. Rylewski

It is certified that error appears in the above-identified patent and that said Letters Patent are hereby corrected as shown below:

Column 2, line 47, "induce" should read --inducer--; column 4, line 4, insert a comma (,) after the word "(constant)"; column 6, line 5, "by" should read --but--; column 6, line 46, delete "about its axis of revolution of said inducer", first occurrence; column 6, line 48, "concial" should read --conical--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents